(12) United States Patent
Kielinen

(10) Patent No.: US 7,290,790 B2
(45) Date of Patent: Nov. 6, 2007

(54) AIRBAG CHUTE ASSEMBLY

(75) Inventor: Jeff Kielinen, Lake Orion, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 304 days.

(21) Appl. No.: 11/160,534

(22) Filed: Jun. 28, 2005

(65) Prior Publication Data

US 2006/0290109 A1 Dec. 28, 2006

(51) Int. Cl.
*B60R 21/16* (2006.01)

(52) U.S. Cl. .............................. 280/728.2; 280/728.3; 280/732

(58) Field of Classification Search ............ 280/728.2, 280/728.1, 728.3, 732
See application file for complete search history.

(56) References Cited

U.S. PATENT DOCUMENTS

| | | | |
|---|---|---|---|
| 5,603,523 A | 2/1997 | Rhule et al. | |
| 5,704,635 A * | 1/1998 | Tajiri et al. ............... | 280/728.2 |
| 5,931,489 A | 8/1999 | Damman et al. | |
| 5,951,039 A | 9/1999 | Severinski et al. | |
| 6,406,056 B2 * | 6/2002 | Yokota .................... | 280/728.2 |
| 6,929,280 B2 * | 8/2005 | Yasuda et al. ........... | 280/728.2 |
| 7,222,875 B2 * | 5/2007 | Meyendorff et al. ..... | 280/728.2 |
| 2003/0234521 A1 | 12/2003 | Schenck et al. | |
| 2004/0004343 A1 | 1/2004 | Pinsenschaum et al. | |
| 2005/0062261 A1 | 3/2005 | Baumbach | |

FOREIGN PATENT DOCUMENTS

| | | |
|---|---|---|
| GB | 2 306 923 A | 5/1997 |
| GB | 2 323 572 A | 9/1998 |

* cited by examiner

*Primary Examiner*—Eric Culbreth
(74) *Attorney, Agent, or Firm*—Brooks Kushman P.C.

(57) ABSTRACT

An airbag chute assembly for a vehicle. The airbag chute assembly includes a chute portion, an inflator housing, and a coupling member that facilitates coupling and decoupling of the inflator housing.

20 Claims, 3 Drawing Sheets

AIRBAG CHUTE ASSEMBLY

BACKGROUND OF THE INVENTION

Field of the Invention

The present invention relates to an airbag module for a motor vehicle and an airbag chute assembly.

SUMMARY OF THE INVENTION

In at least one embodiment of the present invention, an airbag chute assembly is provided. The airbag chute assembly includes a chute portion, an insert portion, an inflator housing, and a coupling member. The chute portion includes an airbag deployment opening and a first aperture. The insert portion is disposed proximate the chute portion and includes a door, a second aperture, and a slot having an open end. The inflator housing includes first and second retaining features. The first retaining feature engages at least one of the first and second apertures. The second retaining feature is disposed in the slot. The coupling member engages the second retaining feature to secure the inflator housing to the chute portion when the coupling member is coupled to the insert portion.

In at least one other embodiment of the present invention, an airbag chute assembly is provided that includes a chute portion, an inflator housing, and a coupling member. The chute portion includes an airbag deployment opening, an aperture, and a slot having an open end. The inflator housing includes first and second retaining features. The first retaining feature is disposed in the aperture. The second retaining feature is disposed in the slot. The coupling member engages the second retaining feature to secure the inflator housing to the chute portion when the coupling member is coupled to the chute portion.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale: some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
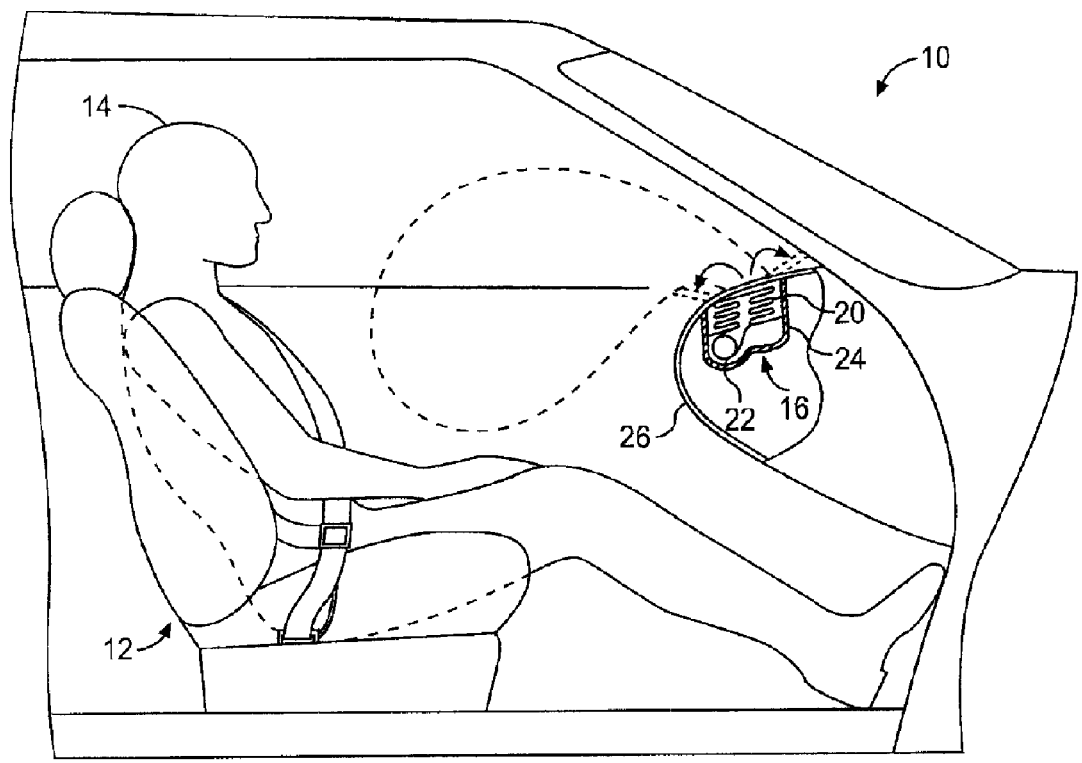
FIG. 1 is a side view of a vehicle having an airbag module that includes an airbag chute assembly.

Referring to FIG. 1, a side view of a vehicle 10 is shown. The vehicle 10 includes a seat assembly 12 that is adapted to receive an occupant 14 and an airbag module 16. The airbag module 16 may have any suitable configuration. In at least one embodiment, the airbag module 16 includes an airbag 20, an inflator 22, and a chute assembly 24.

The airbag module 16 may be disposed in any suitable location. For instance, the airbag module 16 may associated with a front occupant protection system or a side impact occupant protection system. In at least one embodiment, the airbag module 16 may be disposed proximate an interior trim panel 26 that may comprise a visible or "A" surface of a vehicle passenger compartment. In FIG. 1, the interior trim panel 26 is configured as an instrument panel. The interior trim panel 26 may help conceal the airbag module 16 and/or airbag 20 prior to inflation or deployment of the airbag 20. Moreover, the interior trim panel 26 may include one or more doors that open to permit the airbag 20 to deploy into the vehicle passenger compartment.

The airbag 20 is configured to expand from a stored condition to an inflated or deployed condition when an inflation gas is provided with the inflator 22. More specifically, the airbag 20 is deflated and disposed in the airbag module 16 when in the stored condition and is inflated and positioned between a vehicle occupant and an interior vehicle surface when in the inflated condition. In FIG. 1, the airbag 20 is shown in the stored condition in solid lines and is shown in the inflated condition in phantom.

The airbag 20 may have any suitable configuration and may be made of any suitable material. For example, the airbag 20 may be made of multiple panels that are assembled in any suitable manner, such as by stitching, bonding, or with an adhesive. Alternatively, the airbag 20 may be integrally formed. Optionally, the airbag 20 may include one or more tethers that control the shape of the airbag 20 upon deployment. The airbag 20 may be configured to cushion the head, thorax, and/or pelvis of an occupant when deployed.

The chute assembly 24 may be provided in various configurations. In at least one embodiment, such as that shown in FIGS. 2 and 3, the chute assembly 24 may include a chute portion 30, a door insert portion 32, an inflator housing 34, and a coupling member 36. The chute assembly 24 and its assorted components may be made of any suitable material or materials, such as one or more polymeric materials like a thermoplastic elastomer (TPE).

The chute portion 30 includes a plurality of panels that cooperate to define a passage through which the airbag 20 extends upon deployment. The chute portion 30 may have any suitable configuration. For example, the chute portion 30 may include a plurality of panels, such as a first panel 40, a second panel 42, a third panel 44, a fourth panel 46, and a fifth panel 48.

The first panel 40 may be configured to be mounted to another component to secure the chute portion 30 to the vehicle 10. For example, the first panel 40 may be disposed proximate the interior trim panel 26 and/or another suitable component and may be attached in any suitable manner, such as with one or more fasteners, an adhesive, or by vibration or sonic welding. The first panel 40 may include a deployment opening 50. The deployment opening 50 may be at least partially concealed by one or more doors disposed proximate the interior trim panel 26 and/or the chute portion 30 to conceal the airbag 20 prior to deployment.

The second panel 42 may extend from the first panel 40 and may include one or more apertures 52. The apertures 52 may be provided in any suitable quantity and may have any suitable configuration. In the embodiment shown in FIG. 2, a plurality of apertures are provided that are generally rectangular and are generally equally spaced. Of course, the present invention also contemplates embodiments in which one or more apertures have different shapes, spacing, and/or alignment as compared with another aperture. The apertures 52 may help secure the inflator housing 34 to the chute portion 30 as will be described in more detail below.

Figure 2:
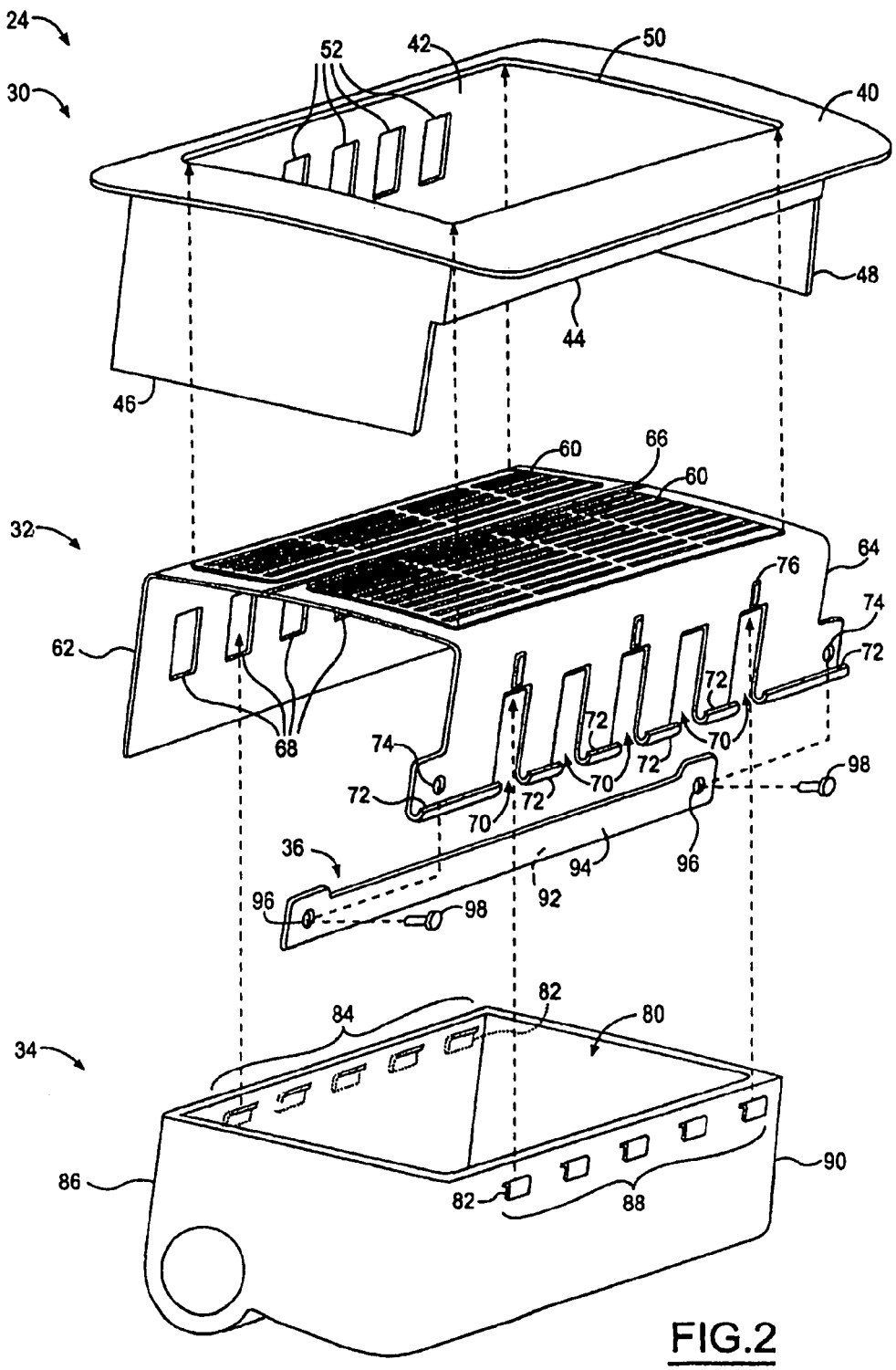
FIG. 2 is an exploded perspective view of one embodiment of an airbag chute assembly.
Figure 3:
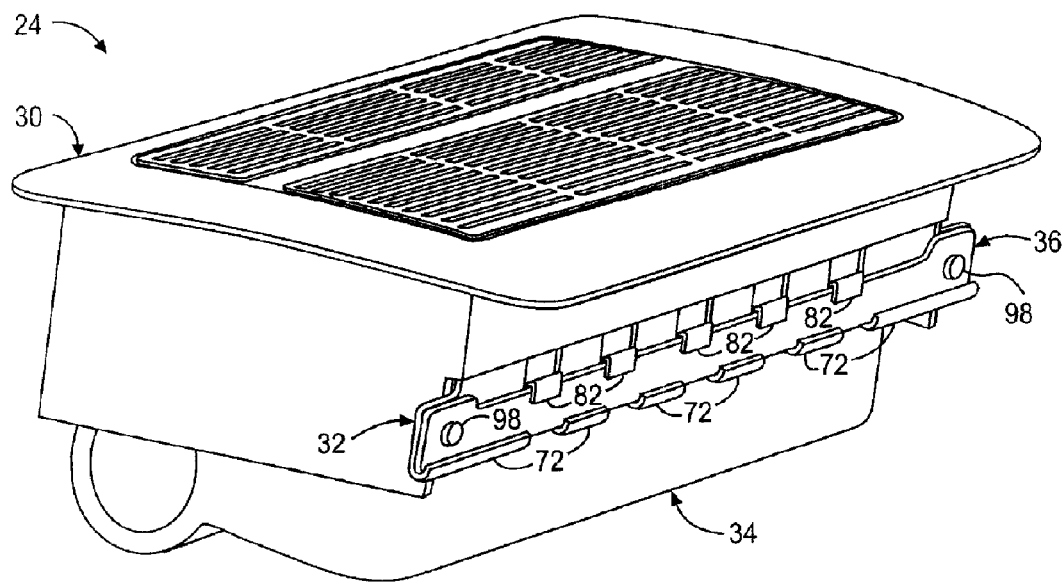
FIG. 3 is a perspective view of the airbag chute assembly of FIG. 2 in an assembled configuration.

The third panel 44 may extend from the first panel 40 and may be spaced apart from the second panel 42. The third panel 44 may extend from the first panel 40 by a same or different amount as another panel, such as the second 42, fourth 46, or fifth panels 48. In the embodiment shown in FIG. 2, the third panel 44 is shorter than the second 42, fourth 46, and fifth panels 48 to provide additional clearance for the coupling member 36 when the coupling member 36 is installed as is best shown in FIG. 3.

The door insert portion 32 may be disposed proximate the chute portion 30 and may have any suitable configuration. For example, the chute portion 30 may include one or more doors 60 that are adapted to open in response to force exerted by the airbag 20. In addition, the door insert portion 32 may include a first side wall 62 and a second side wall 64.

The one or more doors 60 may be at least partially defined by a seam portion 66 that is adapted to break, tear, sever, unsnap or otherwise disengage in response to force exerted by the airbag 20 when the airbag 20 is inflated. The seam portion 66 may have any suitable configuration. For instance, the seam portion 66 may be configured as a tear seam that is disposed on or more surfaces of the door insert portion 32 as shown in FIG. 2. Alternatively, the seam portion 66 may be configured with male and female portions that unsnap or disengage from each other in response to force exerted by a deploying airbag.

The first side wall 62 may include one or more apertures 68, each of which may be generally aligned with the one or more apertures 52 disposed on the chute portion 30. In the embodiment shown in FIG. 2, each aperture 68 on the first side wall 62 is generally aligned with an aperture 52 on the chute portion 30 when assembled. Alternatively, each aperture 68 may be associated with more than one aperture 52 of the chute portion 30 or vice versa. In at least one embodiment, the first side wall 62 may be eliminated or shortened so that it does not overlap the apertures 52 in the chute portion 30. In such embodiments, the apertures 68 may be deleted.

The second side wall 64 may include one or more open ended slots 70 and one or more coupling engagement features 72. The open ended slots 70 may be provided in any suitable quantity, shape, spacing, or configuration. In the embodiment shown, the open ended slots 70 are generally rectangular and have an open end that faces toward the inflator housing 34. A coupling engagement feature 72 may be provided proximate the open end of one or more open ended slots 70. In the embodiment shown, a coupling engagement feature 72 is provided adjacent to two sides of each slot 70. Alternatively, one or more slots 70 may not have a coupling engagement feature 72 disposed adjacent or proximate to its sides. The coupling engagement feature 72 may have any suitable configuration. In the embodiment shown, the coupling engagement feature 72 is configured as a hook having a generally J-shaped cross section. Alternatively, the coupling engagement feature 72 may be a protrusion and may be generally L-shaped. Differently configured coupling engagement features 72 may also be provided in any suitable combinations.

The second wall 64 may also include one or more holes 74. Each hole 74 may receive a fastener that may be provided to secure the coupling member 36 to the door insert portion 32. Optionally, the door insert portion 32 may also include one or more tabs 76 that facilitate alignment of the door insert portion 32 with the chute portion 30.

The inflator housing 34 may include a cavity 80 that is adapted to receive at least a portion of the inflator 22. In addition, the inflator housing 34 may include a plurality of retaining features 82. In the embodiment shown, the inflator housing 34 includes a first set 84 of retaining features disposed on a first side 86 of the inflator housing 34 and a second set 88 of retaining features disposed on a second side 90 of the inflator housing 34. The retaining features 82 may have any suitable configuration. In the embodiment shown, the retaining features 82 are configured as hooks that extend toward the coupling engagement features 72 on the door insert portion 32 when assembled. Each member of the first set 84 may be configured to be disposed in an associated aperture, such as aperture 52 on the chute portion 30 and/or aperture 68 on the door insert portion 32. Similarly, each member of the second set 88 may be configured to be disposed in an associated open ended slot 70.

The coupling member 36 helps secure the inflator housing 34 to the chute portion 30 and/or door insert portion 32. The coupling member 36 may have any suitable configuration. In the embodiment shown, the coupling member 36 is generally planar and includes a first surface 92 and a second surface 94 disposed opposite the first surface 92. The first surface 92 may be disposed proximate at least one member of the second set 88 of retaining features. The second surface 94 may be disposed proximate the coupling engagement features 72 of the door insert portion 32. As such, the coupling member 36 inhibits at least one member of the second set 88 of retaining features 82 from sliding out of the open end of an associated slot 70 when the coupling member 36 is disposed between the coupling engagement features 72 and a member of the second set 88 as shown in FIG. 3.

The coupling member 36 may include one or more enlarged ends that may help prevent the coupling member 36 from being inadvertently removed. In addition, the coupling member 36 may include one or more holes 96. Each hole 96 may align with a hole 74 on the door insert portion 32 for receiving an optional fastener 98. If a fastener is provided, it may be removed to permit the coupling member 36 to be moved to decouple at least a portion of the inflator housing 34 from the door insert portion 32 and/or chute portion 30.

Removing the coupling member 36 (i.e., such that it is not disposed between the coupling engagement features 72 and at least one member of the second set 88 of retaining features) allows the second set 88 of retaining features 82 to slide through the open end of their associated slots 70. Moreover, the inflator housing 34 may then pivot about the first set 84 of retaining features to permit access to the contents of the inflator housing 34 and the chute assembly 24 and/or the complete removal of the inflator housing 34. As such, the present invention simplifies the disassembly and reassembly of an airbag module 16 before or after installation into a vehicle. Moreover, the present invention permits an inflator 22 or other airbag module components to be serviced without prying against "live" components or otherwise deforming, damaging, or loosening the airbag module 16 or its components.

Figure 4:
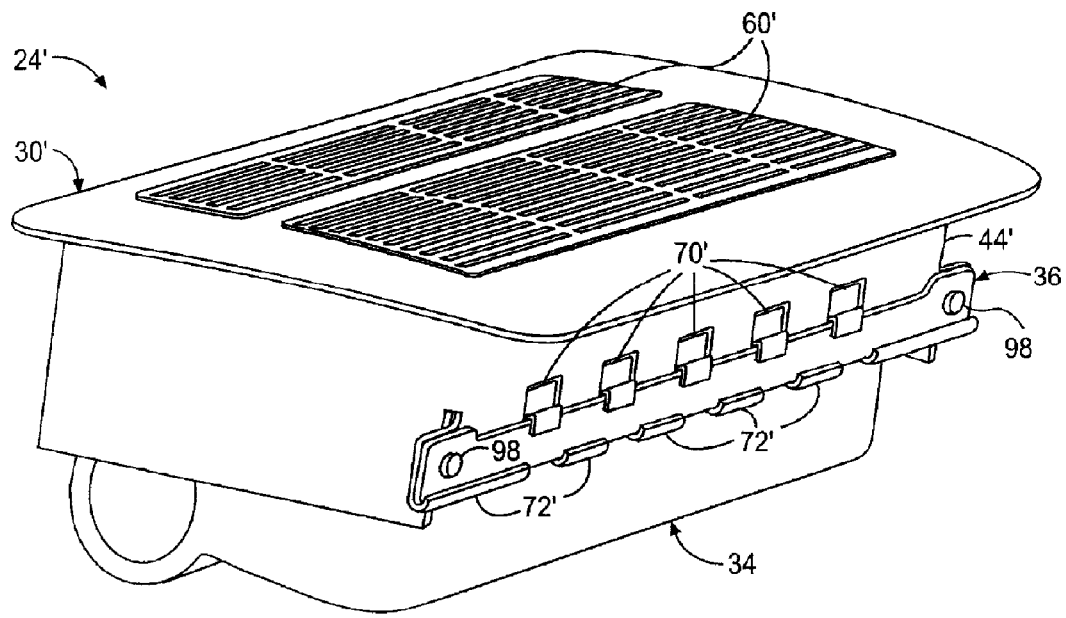
FIG. 4 is a perspective view of another embodiment of an airbag chute assembly.

Referring to FIG. 4, another embodiment of a chute assembly 24' is shown. In the embodiment shown, the chute assembly 24' includes a chute portion 30' as well as an inflator housing 34 and a coupling member 36 as previously described. A door insert portion is not provided.

The chute portion 30' may include one or more apertures, like aperture 52 described above. In addition, the chute portion 30' may include one or more doors 60', one or more open ended slots 70', and one or more coupling engagement features 72'.

The doors 60' may be configured to at least partially conceal a deployment opening. The doors 60' may be integrally formed with the chute portion 30' and may be at least partially defined by a seam portion that is adapted to break, tear, sever, unsnap or otherwise disengage as previously described.

The open ended slots 70' and coupling engagement features 72' may be similar to slots 70 and coupling engagement features 72, respectively. In the embodiment shown in FIG. 4, one or more open ended slots 70' may be provided on or integrally formed with the third wall 44'. One or more coupling engagement features 72' may be provided proximate the open end of one or more open ended slots 70' as previously described. As such, the coupling engagement features 72' may cooperate with the retaining features 82 on the inflator housing 34 to receive the coupling member 36 to help secure the inflator housing 34 to the chute portion 30'.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An airbag chute assembly comprising:
   a chute portion having an airbag deployment opening and a first aperture;
   a door insert portion disposed proximate the chute portion, the door insert portion including a door, a second aperture, and a slot having an open end;
   an inflator housing having a first retaining feature that engages at least one of the first and second apertures and a second retaining feature disposed in the slot; and
   a coupling member that engages the second retaining feature to secure the inflator housing to the chute portion when the coupling member is coupled to the door insert portion.

2. The airbag chute assembly of claim 1 wherein the door insert portion further comprises an engagement feature disposed proximate the open end that engages the coupling member.

3. The airbag chute assembly of claim 1 further comprising a fastener for coupling the coupling member to the door insert portion.

4. The airbag chute assembly of claim 1 wherein the slot is disposed in a first wall and the second aperture is disposed in a second wall such that the second aperture is aligned with the first aperture.

5. The airbag chute assembly of claim 1 wherein the inflator housing receives an inflator that is configured to provide a gas for inflating an airbag.

6. The airbag chute assembly of claim 1 wherein the first and second retaining features are hooks.

7. An airbag chute assembly comprising:
   a chute portion having an airbag deployment opening, an aperture, and a slot having an open end that extends away from the airbag deployment opening;
   an inflator housing having a first retaining feature disposed in the aperture and a second retaining feature disposed in the slot; and
   a coupling member that engages the second retaining feature to secure the inflator housing to the chute portion when the coupling member is coupled to the chute portion.

8. The airbag chute assembly of claim 7 further comprising a door that at least partially covers the airbag deployment opening when the airbag is deflated.

9. The airbag chute assembly of claim 7 wherein the first retaining feature is a hook that extends through the aperture.

10. The airbag chute assembly of claim 7 wherein the chute further comprises an engagement feature disposed proximate the open end of the slot that engages the coupling member.

11. The airbag chute assembly of claim 10 wherein the engagement feature is a hook that extends away from the inflator housing.

12. The airbag chute assembly of claim 10 wherein the second retaining feature is a hook that extends through the slot and engages a first surface of the coupling member when a second surface of the coupling member contacts the engagement feature.

13. The airbag chute assembly of claim 7 wherein the inflator housing is at least partially disengaged from the chute portion when the coupling member is not coupled to the chute portion.

14. An airbag chute assembly comprising:
   a chute portion configured to be mounted to a vehicle trim panel, the chute portion including:
      a first panel having a deployment opening, and
      a second panel disposed proximate the first panel, the second panel having a first aperture;
   a door insert portion at least partially disposed in the chute portion, the door insert portion including:
      a door,
      a first wall including a plurality of engagement features and a slot having an open end, and
      a second wall having a second aperture disposed proximate the first aperture; and
   an inflator housing configured to at least partially receive an inflator configured to provide a gas for inflating an airbag, the inflator housing having a first retaining feature disposed in the first and second apertures and a second retaining feature disposed in the slot; and
   a coupling member disposed between the second retaining feature and plurality of engagement features to couple the inflator housing to the door insert portion.

15. The airbag chute assembly of claim 14 further comprising a fastener for coupling the coupling member to the door insert portion.

16. The airbag chute assembly of claim 14 wherein the first retaining feature is a hook.

17. The airbag chute assembly of claim 14 wherein the second retaining feature is a hook that extends through the slot and engages the coupling member when the coupling member is received by a plurality of hook-shaped engagement features.

18. The airbag chute assembly of claim 14 wherein the inflator housing is partially decoupled from the door insert portion when the coupling member is not received by the plurality of engagement features.

19. The airbag chute assembly of claim 14 wherein the first aperture is aligned with the second aperture.

20. The airbag chute assembly of claim 14 wherein the first wall further comprises first and second engagement features disposed on opposite sides of the slot.

* * * * *